United States Patent
Sui et al.

(10) Patent No.: US 11,799,945 B2
(45) Date of Patent: Oct. 24, 2023

(54) PIPELINED FILE SERVER BASED DATA TRANSMISSION

(71) Applicant: International Business Machines Corporation, Armonk, NY (US)

(72) Inventors: Guang Han Sui, Beijing (CN); Wei Ge, Beijing (CN); Juan Yang, Xi'An (CN); Lan Zhe Liu, Bei Jing (CN); Le Yao, Xian (CN); Li Jun BJ Zhu, Bei Jing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 17/376,297

(22) Filed: Jul. 15, 2021

(65) Prior Publication Data

US 2023/0016582 A1   Jan. 19, 2023

(51) Int. Cl.
  *G06F 15/16* (2006.01)
  *H04L 67/06* (2022.01)
  *G06F 16/182* (2019.01)

(52) U.S. Cl.
  CPC ............ *H04L 67/06* (2013.01); *G06F 16/183* (2019.01)

(58) Field of Classification Search
  CPC .................... H04L 67/1095; H04L 67/1097
  See application file for complete search history.

(56) References Cited

U.S. PATENT DOCUMENTS

| | | | | |
|---|---|---|---|---|
| 6,718,361 | B1* | 4/2004 | Basani | H04L 67/1095 709/201 |
| 9,031,053 | B2* | 5/2015 | Palanki | H04B 7/2606 370/347 |
| 2009/0006641 | A1* | 1/2009 | Yaqoob | H04L 12/1886 709/231 |
| 2010/0153638 | A1* | 6/2010 | Yochai | G06F 11/1464 711/E12.019 |
| 2011/0107094 | A1* | 5/2011 | Resch | G06F 15/17331 713/168 |
| 2018/0253493 | A1* | 9/2018 | Busayarat | G06F 16/27 |
| 2020/0322416 | A1* | 10/2020 | Sui | H04L 67/06 |
| 2021/0042048 | A1 | 2/2021 | Zhao et al. | |

OTHER PUBLICATIONS

Beausoleil et al., Fast Host Application Access to Local Area Network Server Files, ip.com, Jan. 1, 1994.
Saive, Pscp—Transfer/Copy Files to Multiple Linux Servers Using Single Shell, Dec. 5, 2015, https://www.tecmint.com/copy-files-to-multiple-linux-servers/.
James, SCP Linux—Securely Copy Files Using SCP examples, Apr. 20, 2020, https://haydenjames.io/linux-securely-copy-files-using-scp/.

* cited by examiner

*Primary Examiner* — Nicholas R Taylor
*Assistant Examiner* — Ho T Shiu
(74) *Attorney, Agent, or Firm* — Garg Law Firm, PLLC; Rakesh Garg; Michael O'Keefe

(57) ABSTRACT

A block of data intended for a set of receiving computer systems comprising a first system and a second system is divided into a set of equal-size portions. A first portion of the set of portions is transmitted from a first file server storing the block of data to the first system. The first portion is relayed from the first file server to a second file server concurrently with the transmitting. The first portion of the set of portions is transmitted from the second file server to the second system.

17 Claims, 10 Drawing Sheets

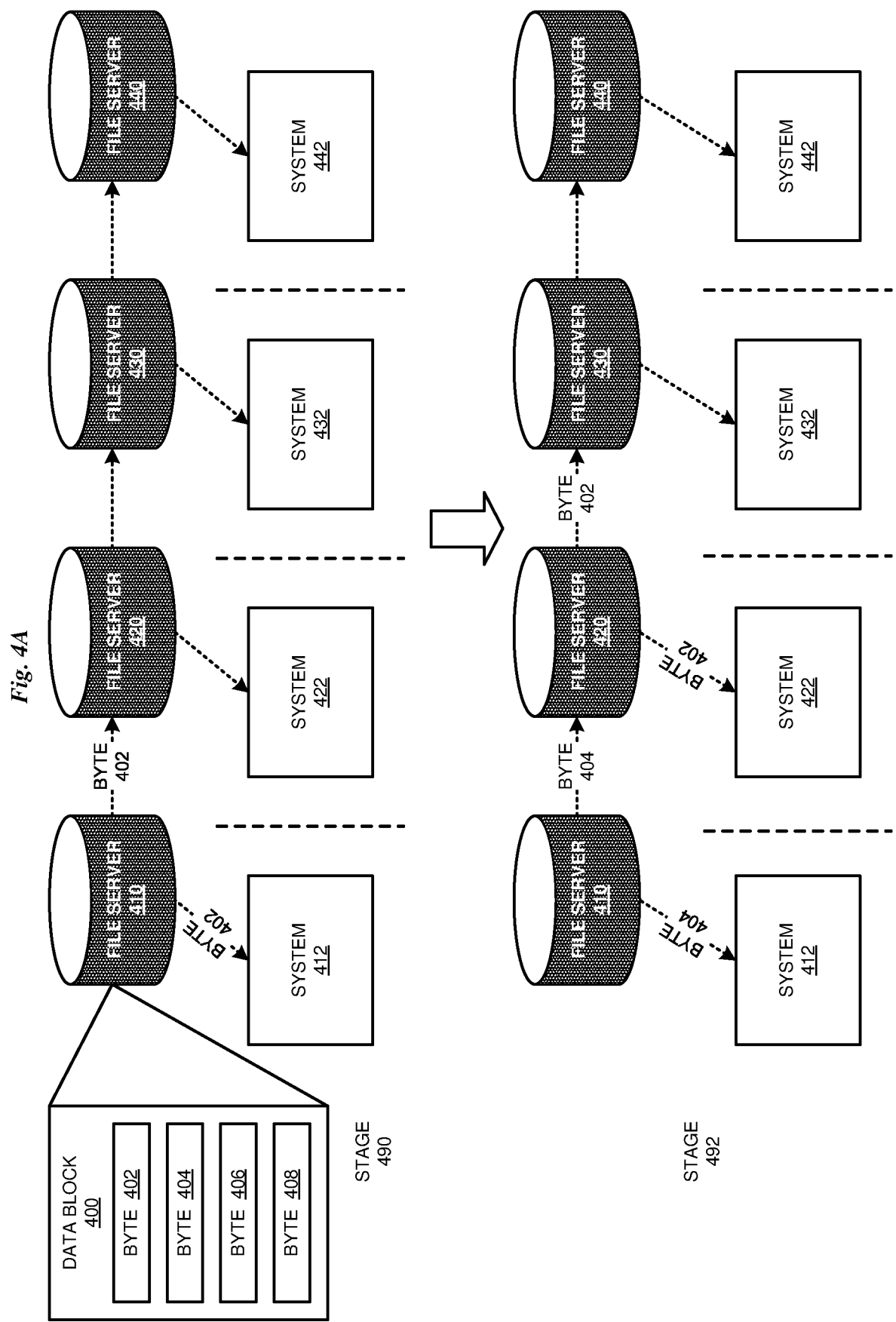

PIPELINED FILE SERVER BASED DATA TRANSMISSION

BACKGROUND

The present invention relates generally to a method, system, and computer program product for pipelined data transmission. More particularly, the present invention relates to a method, system, and computer program product for pipelined file server based data transmission.

A file server is a computer system configured to provide data, which need not be in a file format or any particular format, to one or more client computer systems over a computer network. In some configurations, a file server provides data to a client in response to a request from the client. In other configurations, a file server provides data to one or more clients without a request. For example, when preparing an initial configuration for a set of clients, a file server might provide the same data to each client to that all of the clients are configured identically to each other.

SUMMARY

The illustrative embodiments provide a method, system, and computer program product. An embodiment includes a method that divides, into a set of equal-size portions, a block of data intended for a set of receiving computer systems, the set of receiving computer systems comprising a first system and a second system. An embodiment transmits, from a first file server to the first system, a first portion of the set of portions, the first file server storing the block of data. An embodiment relays, from the first file server to a second file server concurrently with the transmitting, the first portion. An embodiment causes transmitting, from the second file server to the second system, the first portion of the set of portions.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4A depicts an example of pipelined file server based data transmission in accordance with an illustrative embodiment;

DETAILED DESCRIPTION

Figure 1:
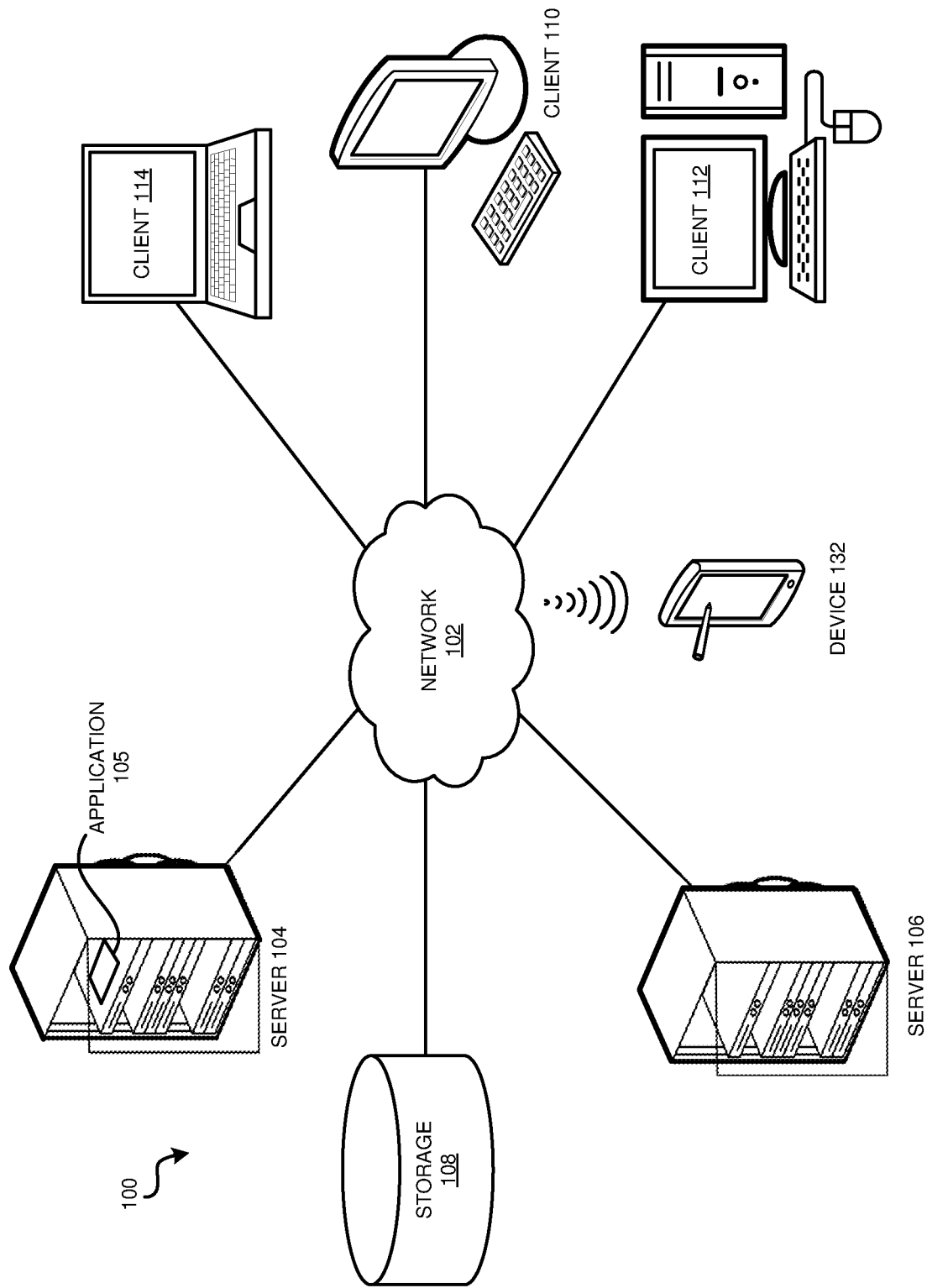
FIG. 1 depicts a block diagram of a network of data processing systems in which illustrative embodiments may be implemented.

The illustrative embodiments recognize that, because moving data from a file server to one or more client systems is limited by the filter server's and communications network's data transmission rates, moving large amounts of data can consume an unacceptably long time, particularly when data is to be transferred to multiple client systems. One method of speeding up data transmission is to copy the data to multiple file servers, and transmit the data in parallel from each file server to a corresponding client system, but there may not be sufficient storage space for the data on multiple file servers, and storing the data on multiple file servers might not be allowed by an applicable data management policy. Another method of speeding up data transmission is to implement a storage area network (SAN) or network attached storage (NAS). A SAN is a dedicated network that interconnects and delivers shared pools of storage devices to multiple systems. Each system can access shared storage as if the shared storage were a drive directly attached to the system. NAS is a file-level (as opposed to block-level storage) computer data storage server connected to a computer network providing data access to a group of client systems. However, implementing either SAN or NAS requires additional, dedicated hardware that might not needed at all times, adding cost. Another method of speeding up data transmission is to implement a pipeline, in which a file server transmits data to one client system. As the data is received the client relays the data to another client system, and so on, in a pipeline fashion. However, although a pipeline implementation is efficient and uses existing hardware, having a client system relay data to another client system might not be allowed by an applicable data management policy. Thus, the illustrative embodiments recognize that there is an unmet need for improved data transmission to multiple client systems, that uses existing hardware, is faster than presently available methods, and does not violate a data management policy.

The illustrative embodiments recognize that the presently available tools or solutions do not address these needs or provide adequate solutions for these needs. The illustrative embodiments used to describe the invention generally address and solve the above-described problems and other problems related to pipelined file server based data transmission.

An embodiment can be implemented as a software application. The application implementing an embodiment can be configured as a modification of an existing file server based data transmission system, as a separate application that operates in conjunction with an existing file server based data transmission system, a standalone application, or some combination thereof.

Particularly, some illustrative embodiments provide a method that divides a block of data intended for a set of systems into portions, transmits the first portion from a file server to a computer system, relays the first portion to a second file server, causes transmission of the first portion from the second file server to a second system, and repeats the transmitting and relaying for remaining portions of the data and, optionally, additional file servers and systems.

An embodiment, at a file server, receives a request to provide a block of data stored on the file server to one or more client computer systems. The block of data need not be in any particular format or have any predetermined size. For example, the block of data may be a file (in any file format), multiple files, or in the form of data from a database. One embodiment processes a data request upon receipt. Another embodiment waits a predetermined amount of time before processing a data request. If, within the predetermined amount of time, the embodiment receives a second data request to provide the same data to a different one or more client computer systems, the embodiment consolidates the two requests into one consolidated request. Multiple data requests for the same data can occur, for example, when multiple systems request the same configuration or installation data during their configuration processes.

An embodiment divides the requested block of data into a set of portions. In one embodiment, all of the portions are equally sized; in another embodiment, the portions have different sizes. In one embodiment, all of the portions have a predetermined size, such as a byte (8 bits), word (2 bytes), dword (4 bytes), qword (8 bytes), or the like. Another embodiment selects one or more portion sizes according to a data transmission capability of a file server or the data communications network being used, or a data acceptance capability of a receiving system. For example, one data center might be configured such that a portion size of one byte is most efficient for data transmission within that data center, and another data center might be configured such that a portion size of one qword is most efficient for data transmission within that data center. Techniques for determining data transmission capability of a file server and the data communications network being used, and a data acceptance capability of a receiving system are presently known.

An embodiment also determines the number of file servers to be used to transmit the block of data and the number of destination systems each file server transmits the data to. One embodiment uses predetermined values for the number of file servers, the number of destination systems per file server, or both. Another embodiment sets the number of file servers, the number of destination systems per file server, or both based on one or more of the number of file servers available for use, current loads on file servers that could be used, the size of the block of data, the number of receiving systems, a data acceptance capability of a receiving system, and other factors. Techniques for determining a sufficiently efficient or optimal data transmission configuration and sets the number of file servers, the number of destination systems per file server, or both to achieve the desired configuration are presently known. In addition, if multiple file servers are to transmit data to one system, an embodiment optionally divides each portion of the data into subdivisions, each of which are to be sent by one of the file servers. For example, if two file systems are to transmit data to one system, an embodiment might divide each portion in half, with the odd subdivisions sent by one file system and the even subdivisions sent by the other file system.

An embodiment, at a first file server, transmits a portion of the data to one or more destination computer systems. The embodiment also relays the same portion of data to a second file server. At the second file server, an embodiment transmits the data portion to one or more destination computer systems, and relays the same portion of data to an additional file server if one is being used. At an additional file server, an embodiment transmits the data portion to one or more destination computer systems, and relays the same portion of data to another additional file server if one is being used. Embodiments at each additional file server also perform the relaying and data transmission.

Once the embodiment at the first file server has transmitted and relayed a first portion of the data, the embodiment transmits and relays a second portion of data. At the second file server, an embodiment transmits and relays the second portion, and so on down the chain of file servers. The embodiment at the first file server repeats the transmission and relay process for each remaining portion of the data, and embodiments in the second and additional file servers repeat the transmission and replay process for each data portion as they receive it.

If multiple file servers are configured to transmit data to one system, an embodiment at the first file server of those transmitting to the system optionally divides each portion of the data into subdivisions, each of which are to be sent by one of the file servers. The embodiment relays the full portion to the next file server in the chain, but only transmits one subdivision to the system. An embodiment at the next file server transmits another subdivision to the system, but relays the full portion to the next file server in the chain.

Thus, the chain of file servers acts as a pipeline. Embodiments within file servers in the chain, except for the first file server in the chain, need not store a data portion once it has been transmitted to a system and relayed to another file server. Instead, embodiments store the portion in volatile memory or another temporary storage location, and delete the portion after transmission and relaying, thus saving data storage space and maintaining conformity with a data storage policy limiting which file servers may maintain stored copies of the block of data.

The manner of pipelined file server based data transmission described herein is unavailable in the presently available methods in the technological field of endeavor pertaining to data transmission to client systems. A method of an embodiment described herein, when implemented to execute on a device or data processing system, comprises substantial advancement of the functionality of that device or data processing system in dividing a block of data intended for a set of systems into portions, transmitting the first portion from a file server to a computer system, relaying the first portion to a second file server, causing transmission of the first portion from the second file server to a second system, and repeating the transmitting and relaying for remaining portions of the data and, optionally, additional file servers and systems.

The illustrative embodiments are described with respect to certain types of data, blocks, portions, subdivisions of portions, file servers, transmissions, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
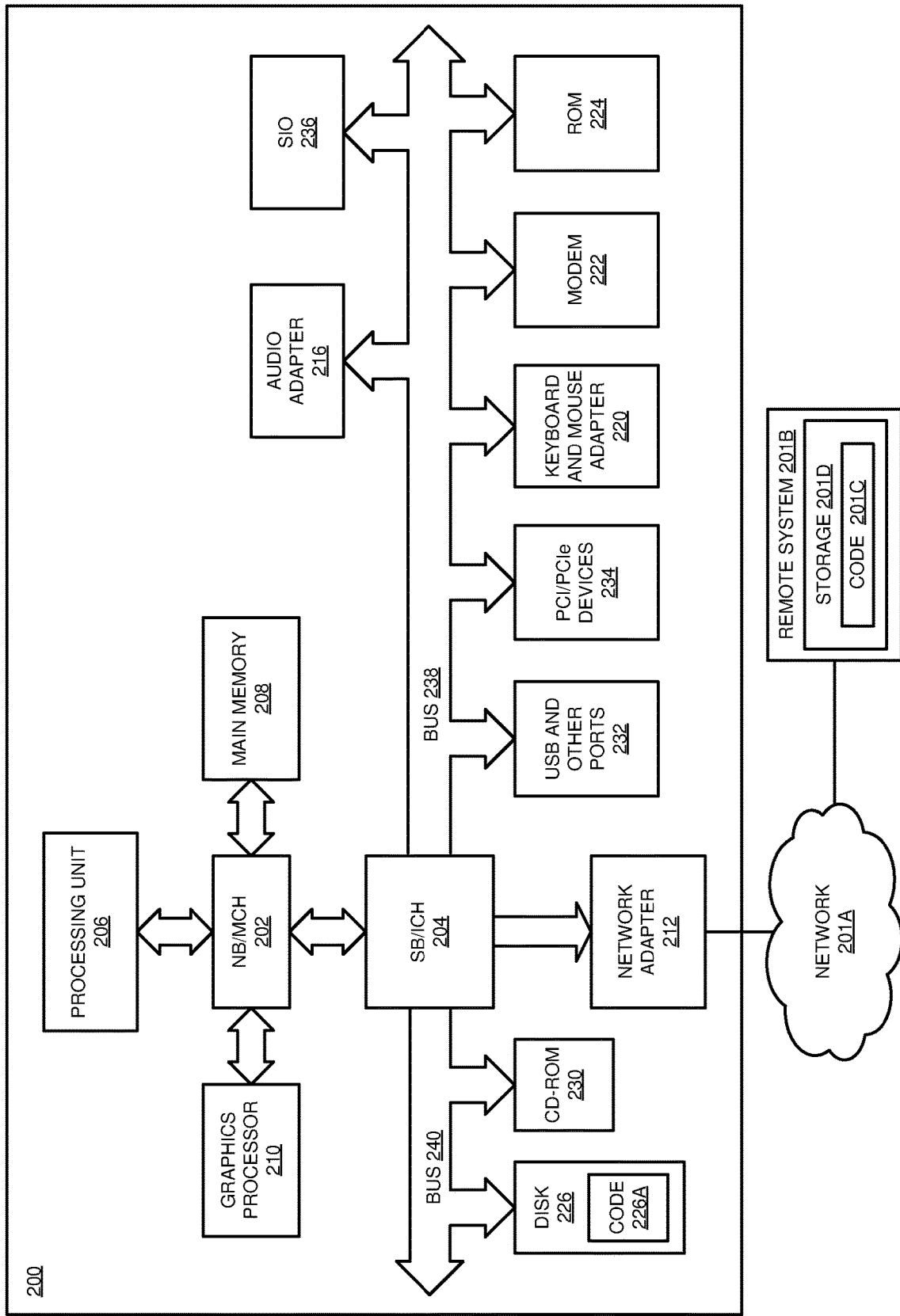
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. For example, application 105, executing in server 104, might relay data to another copy of application 105 executing in server 106. Application 105 executing in server 106 might relay data to another copy of application 105 executing in another device. Each copy of application 105 might also transmit data to one or more systems such as clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
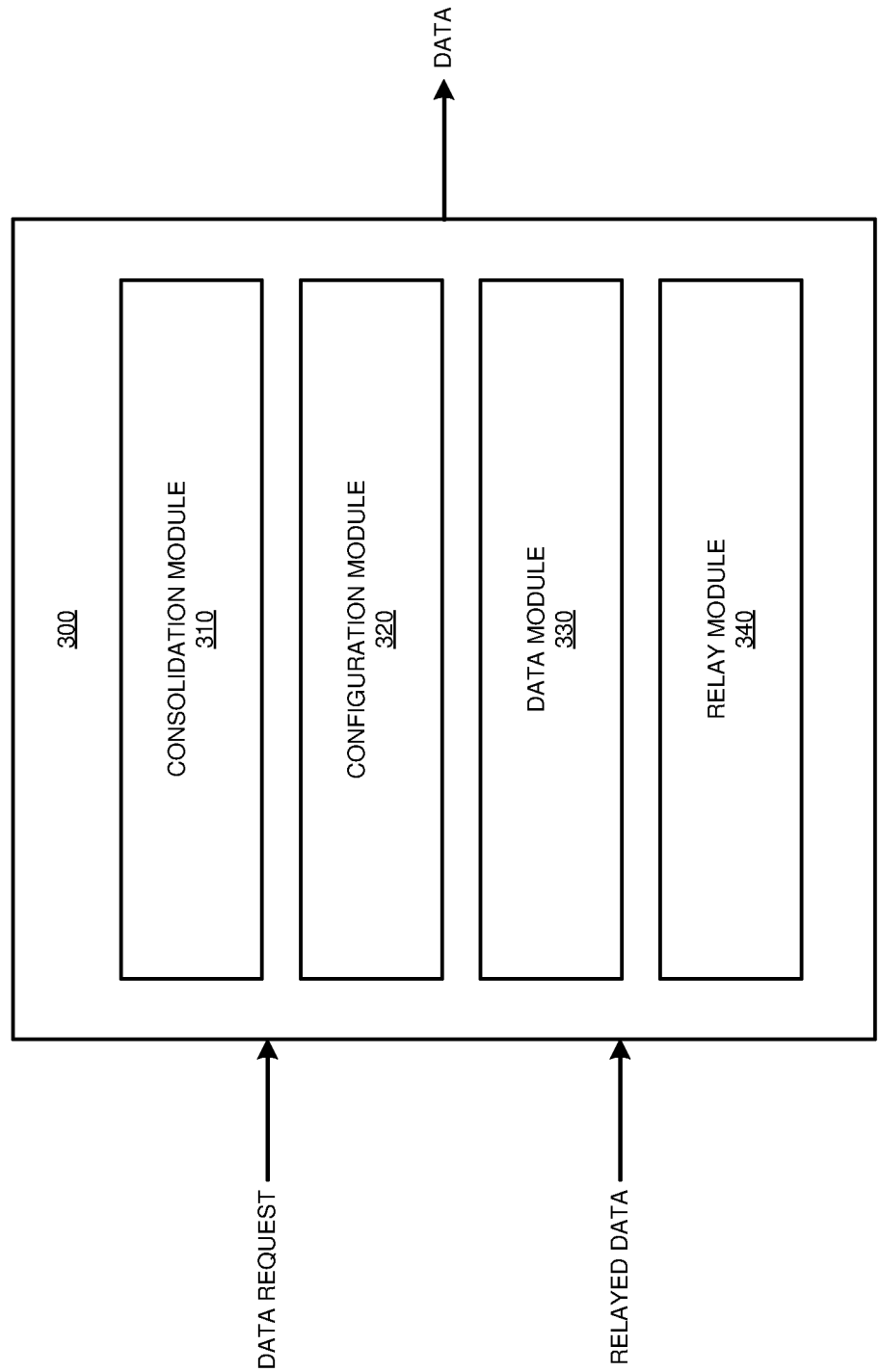
FIG. 3 depicts a block diagram of an example configuration for pipelined file server based data transmission in accordance with an illustrative embodiment.

With reference to FIG. 3, this figure depicts a block diagram of an example configuration for pipelined file server based data transmission in accordance with an illustrative embodiment. Application 300 is an example of application 105 in FIG. 1 and executes in any of servers 104 and 106, clients 110, 112, and 114, and device 132 in FIG. 1.

Application 300, at a file server, receives a request to provide a block of data stored on the file server to one or more client computer systems. The block of data need not be in any particular format or have any predetermined size. One implementation of consolidation module 310 processes a data request upon receipt. Another implementation of consolidation module 310 waits a predetermined amount of time before processing a data request. If, within the predetermined amount of time, module 310 receives a second data request to provide the same data to a different one or more client computer systems, module 310 consolidates the two requests into one consolidated request.

Configuration module 320 divides the requested block of data into a set of portions. In one implementation of module 320, all of the portions are equally sized; in another implementation of module 320, the portions have different sizes. In one implementation of module 320, all of the portions have a predetermined size, such as a byte (8 bits), word (2 bytes), dword (4 bytes), qword (8 bytes), or the like. Another implementation of module 320 selects one or more portion sizes according to a data transmission capability of a file server or the data communications network being used, or a data acceptance capability of a receiving system.

Module 320 also determines the number of file servers to be used to transmit the block of data and the number of destination systems each file server transmits the data to. One implementation of module 320 uses predetermined values for the number of file servers, the number of destination systems per file server, or both. Another implementation of module 320 sets the number of file servers, the number of destination systems per file server, or both based on one or more of the number of file servers available for use, current loads on file servers that could be used, the size of the block of data, the number of receiving systems, a data acceptance capability of a receiving system, and other factors. In addition, if multiple file servers are to transmit data to one system, module 320 optionally divides each portion of the data into subdivisions, each of which are to be sent by one of the file servers.

Data module 330, at a first file server, transmits a portion of the data to one or more destination computer systems. Relay module 340, at the first file server, relays the same portion of data to a second file server. At the second file server, data module 330 transmits the data portion to one or more destination computer systems, and relay module 340 relays the same portion of data to an additional file server if one is being used. At an additional file server, data module 330 transmits the data portion to one or more destination computer systems, and relay module 340 relays the same portion of data to another additional file server if one is being used. Implementations of modules 330 and 340 at each additional file server also perform the relaying and data transmission.

Once application 300 at the first file server has transmitted and relayed a first portion of the data, the application transmits and relays a second portion of data. At the second file server, application 300 transmits and relays the second portion, and so on down the chain of file servers. Application 300 at the first file server repeats the transmission and relay process for each remaining portion of the data, and instances of application 300 in the second and additional file servers repeat the transmission and replay process for each data portion as they receive it.

If multiple file servers are configured to transmit data to one system, configuration module 320 at the first file server of those transmitting to the system optionally divides each portion of the data into subdivisions, each of which are to be sent by one of the file servers. Relay module 340 relays the full portion to the next file server in the chain, but data module 330 only transmits one subdivision to the system. In another instance of application 300 at the next file server, data module 330 transmits another subdivision to the system, but relay module 340 relays the full portion to the next file server in the chain.

With reference to FIG. 4A, this figure depicts an example of pipelined file server based data transmission in accordance with an illustrative embodiment. The example can be executing using instances of application 300 in each file server.

As depicted, file server 410 stores data block 400, including bytes 402, 404, 406, and 408. Configuration module 320 executing in file server 410 has determined that data block 400 is to be sent a byte at a time to systems 412, 422, 432, and 442, using file servers 410, 420, 430, and 440, with one file server transmitting to one system. Note that additional file servers could also be used to transmit to additional systems. Thus, at stage 490 an instance of application 300 executing in file server 410 transmits byte 402 to system 412 and relays byte 402 to file server 420. Next, at stage 492 file server 420 transmits byte 402 to system 422 and relays byte 402 to file server 430, while file server 410 transmits byte 404 to system 412 and relays byte 404 to file server 420.

Figure 4B:
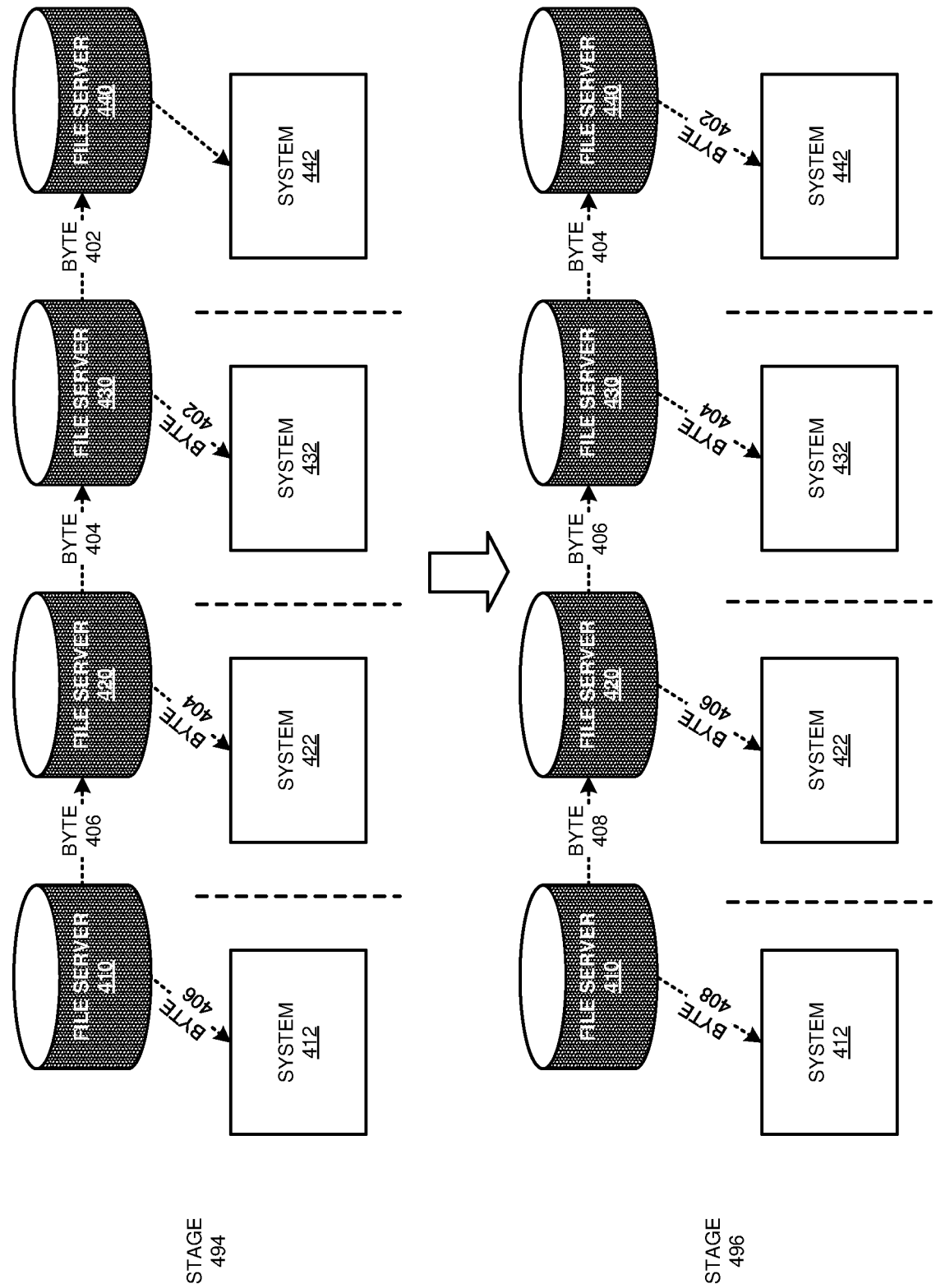
FIG. 4B depicts a continued example of pipelined file server based data transmission in accordance with an illustrative embodiment

With reference to FIG. 4B, this figure depicts a continued example of pipelined file server based data transmission in accordance with an illustrative embodiment. File servers 410, 420, 430, and 440, systems 412, 422, 432, and 442, data block 400, and bytes 402, 404, 406, and 408 are the same as file servers 410, 420, 430, and 440, systems 412, 422, 432, and 442, data block 400, and bytes 402, 404, 406, and 408 in FIG. 4A.

Stage 494 follows stage 492 in FIG. 4A. At stage 494 an instance of application 300 executing in file server 430 transmits byte 402 to system 432 and relays byte 402 to file server 440. File server 420 transmits byte 404 to system 422 and relays byte 404 to file server 430, while file server 410 transmits byte 406 to system 412 and relays byte 406 to file server 420.

Next, at stage 496 file server 440 transmits byte 402 to system 442. If an additional file server were being used, file server 440 would relay byte 402 to the additional file server. File server 430 transmits byte 404 to system 432 and relays byte 404 to file server 440. File server 420 transmits byte 406 to system 422 and relays byte 406 to file server 430, while file server 410 transmits byte 408 to system 412 and relays byte 408 to file server 420. Instances of application 300 continues in this pipeline fashion, transmitting additional portions of data block 400.

Figure 5:
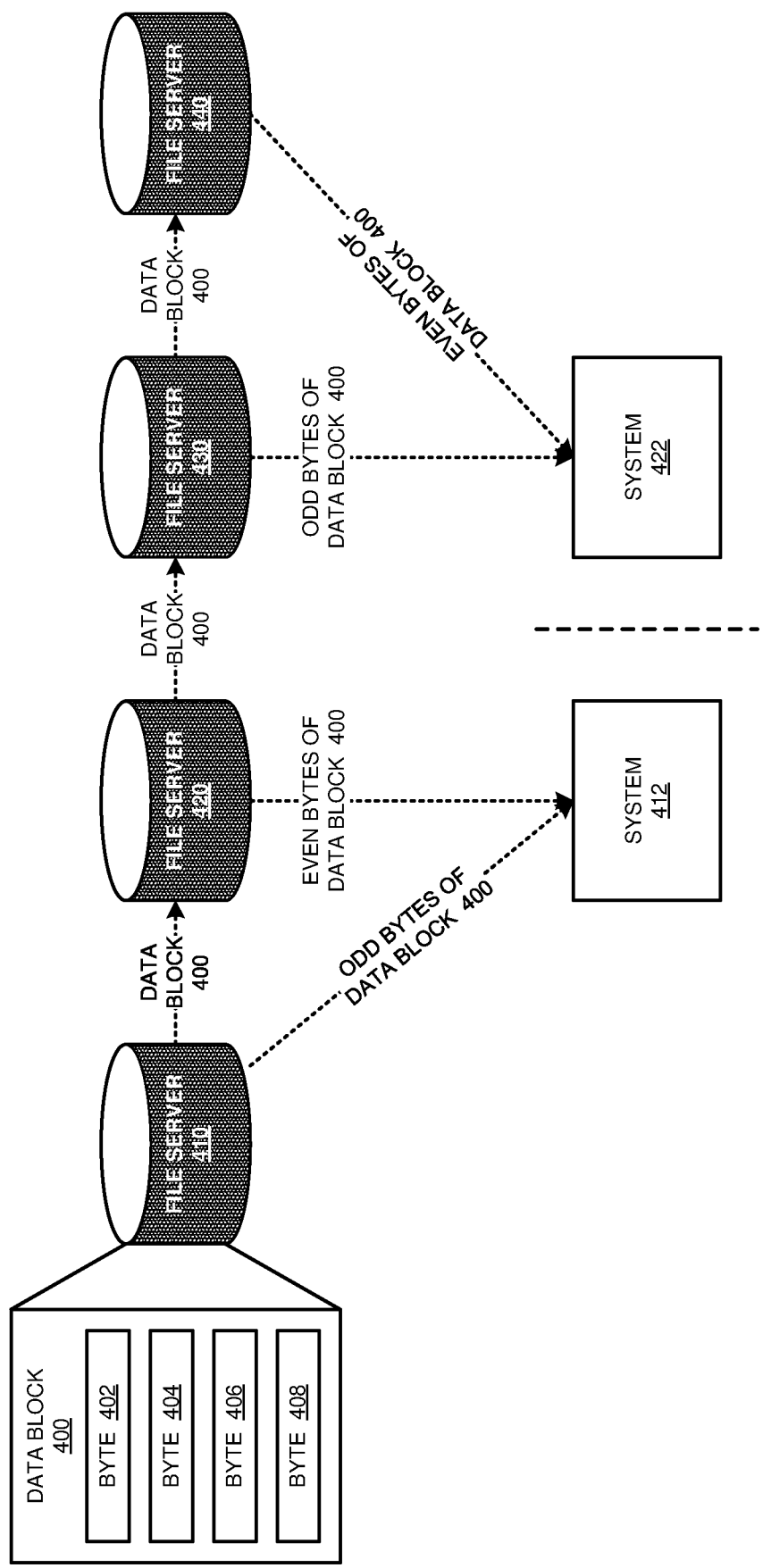
FIG. 5 depicts an example of pipelined file server based data transmission in accordance with an illustrative embodiment.

With reference to FIG. 5, this figure depicts an example of pipelined file server based data transmission in accordance with an illustrative embodiment. File servers 410, 420, 430, and 440, systems 412 and 422, data block 400, and bytes 402, 404, 406, and 408 are the same as file servers 410, 420, 430, and 440, systems 412 and 422, data block 400, and bytes 402, 404, 406, and 408 in FIG. 4A.

In particular, FIG. 5 depicts a configuration in which file servers 410 and 420 both transmit subdivisions of portions of data block 400, portion by portion, to system 412. In particular, file server 410 transmits the odd bytes of data block 400 to system 412, while file server 420 transmits the even bytes of data block 400 to system 412. File server 410 also relays data block 400, portion by portion, to file server 420, which relays data block 400 to file server 430. File server 430 transmits the odd bytes of data block 400 to system 422, while file server 440 transmits the even bytes of data block 400 to system 422. File server 430 also relays data block 400, portion by portion, to file server 430, which relays data block 400 to an additional file server if one is used.

Figure 6:
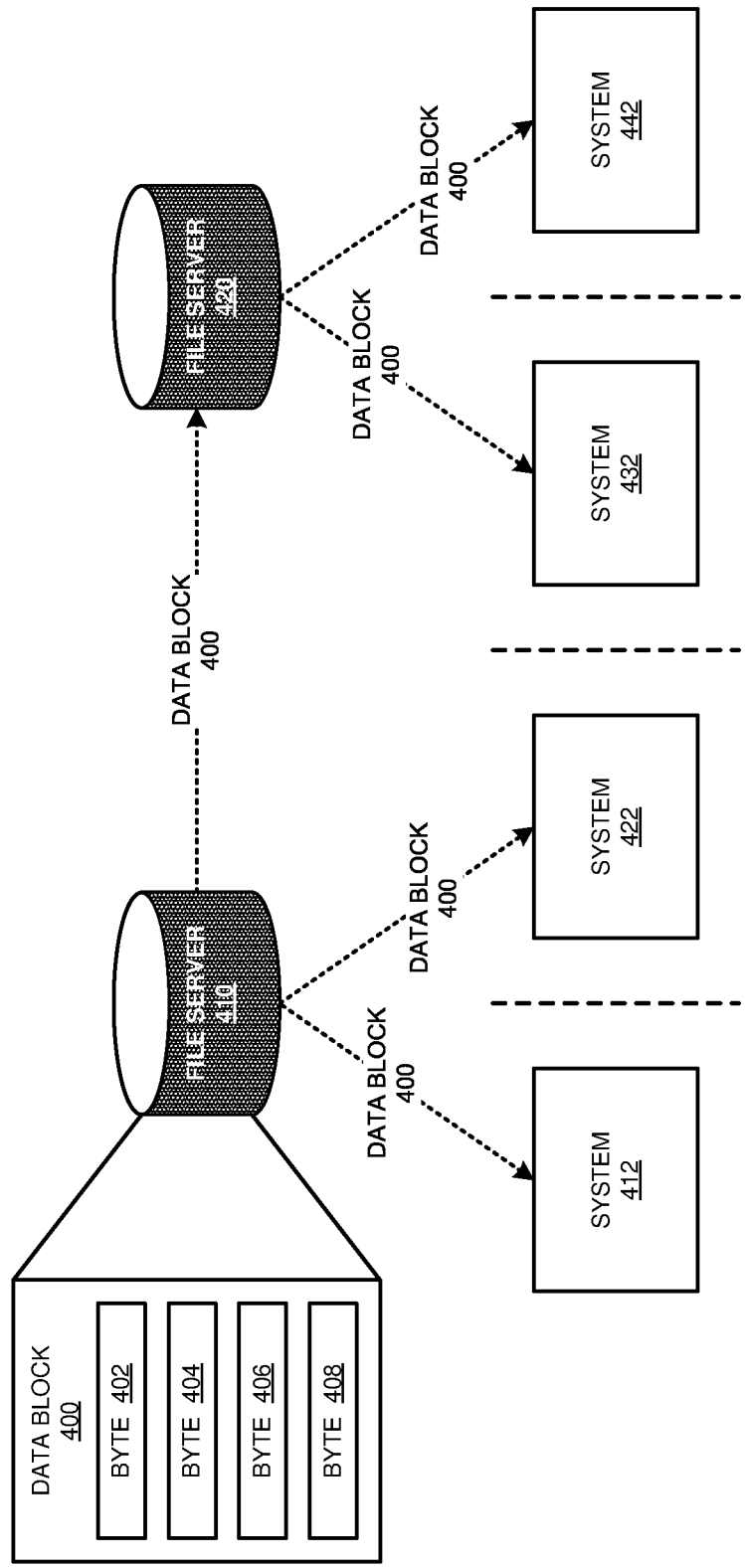
FIG. 6 depicts an example of pipelined file server based data transmission in accordance with an illustrative embodiment.

With reference to FIG. 6, this figure depicts an example of pipelined file server based data transmission in accordance with an illustrative embodiment. File servers 410 and 420, systems 412, 422, 432, and 442, data block 400, and bytes 402, 404, 406, and 408 are the same as file servers 410 and 420, systems 412, 422, 432, and 442, data block 400, and bytes 402, 404, 406, and 408 in FIG. 4A.

In particular, FIG. 6 depicts a configuration in which file server 410 transmits data block 400, portion by portion, to systems 412 and 422. File server 410 also relays data block 400, portion by portion, to file server 420, which transmits data block 400 to systems 432 and 442.

Figure 7:
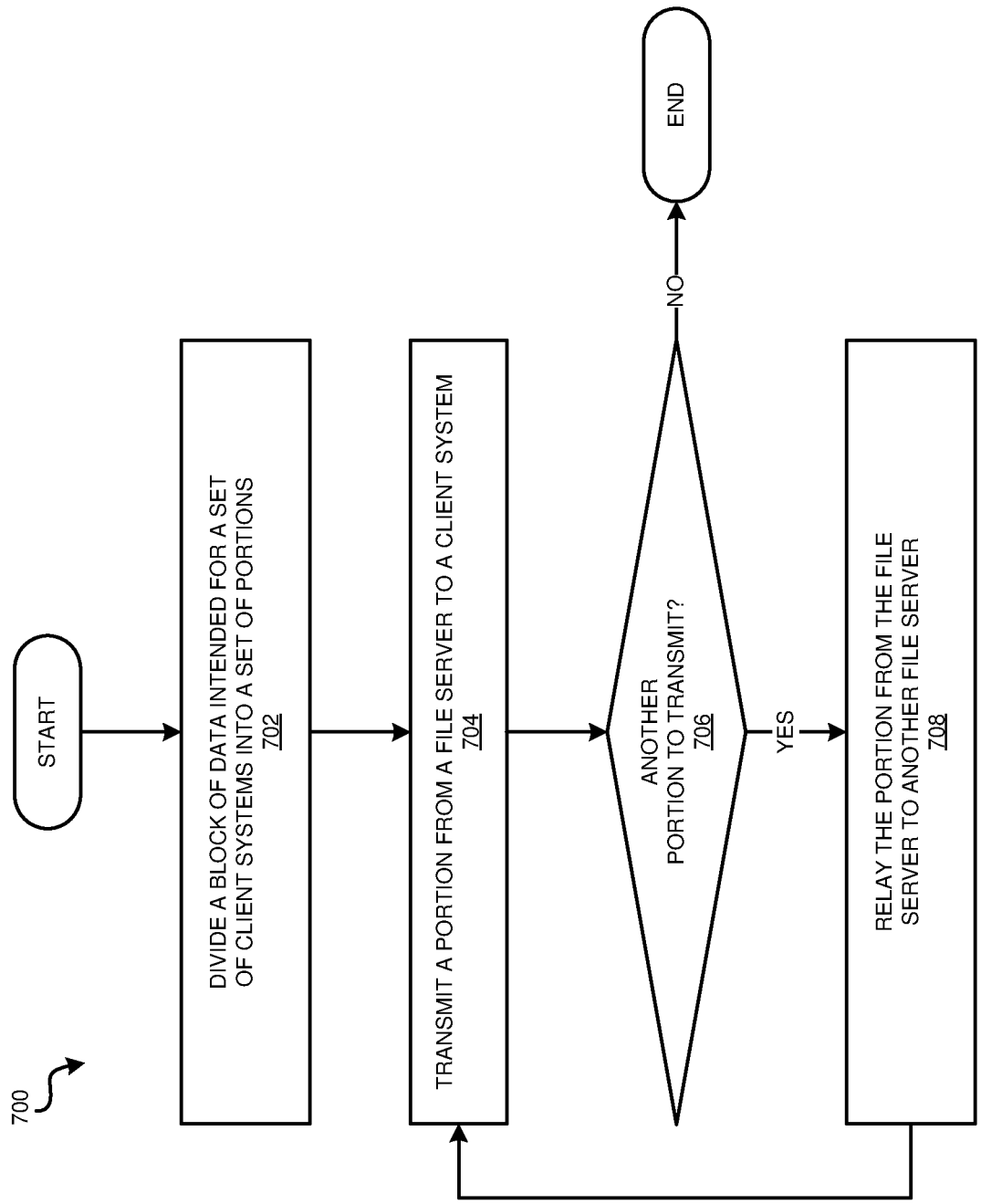
FIG. 7 depicts a flowchart of an example process for pipelined file server based data transmission in accordance with an illustrative embodiment.

With reference to FIG. 7, this figure depicts a flowchart of an example process for pipelined file server based data transmission in accordance with an illustrative embodiment. Process 700 can be implemented in application 300 in FIG. 3.

In block 702, the application divides a block of data intended for a set of client systems into a set of portions. In block 704, the application transmits a portion from a file server to a client system. In block 706, the application determines whether there are additional portions to transmit. If not ("NO" path of block 706), the application ends. Otherwise ("YES" path of block 706), in block 708 the application relays the portion from the file server to another file server, then returns to block 704 to process another portion.

Figure 8:
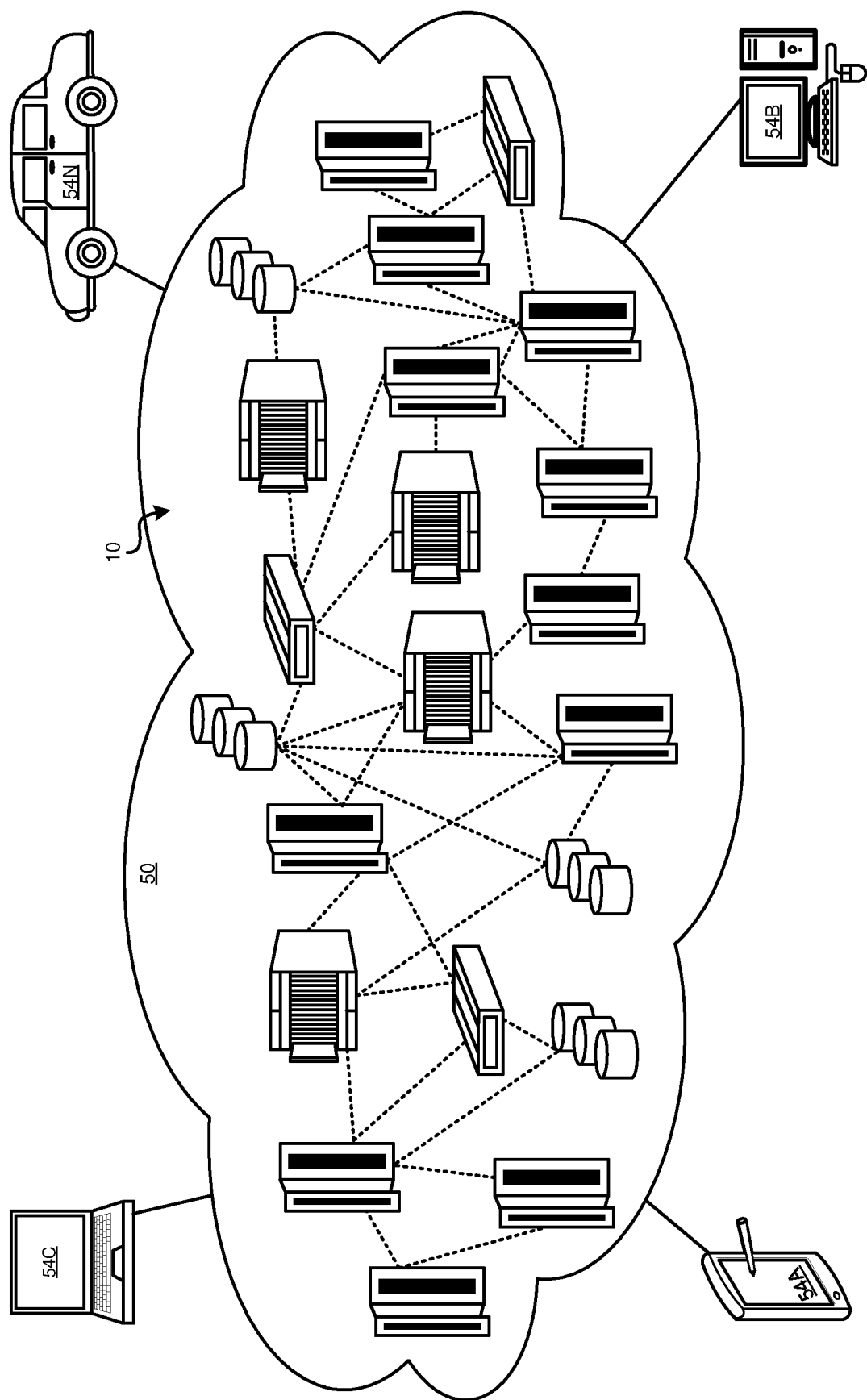
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
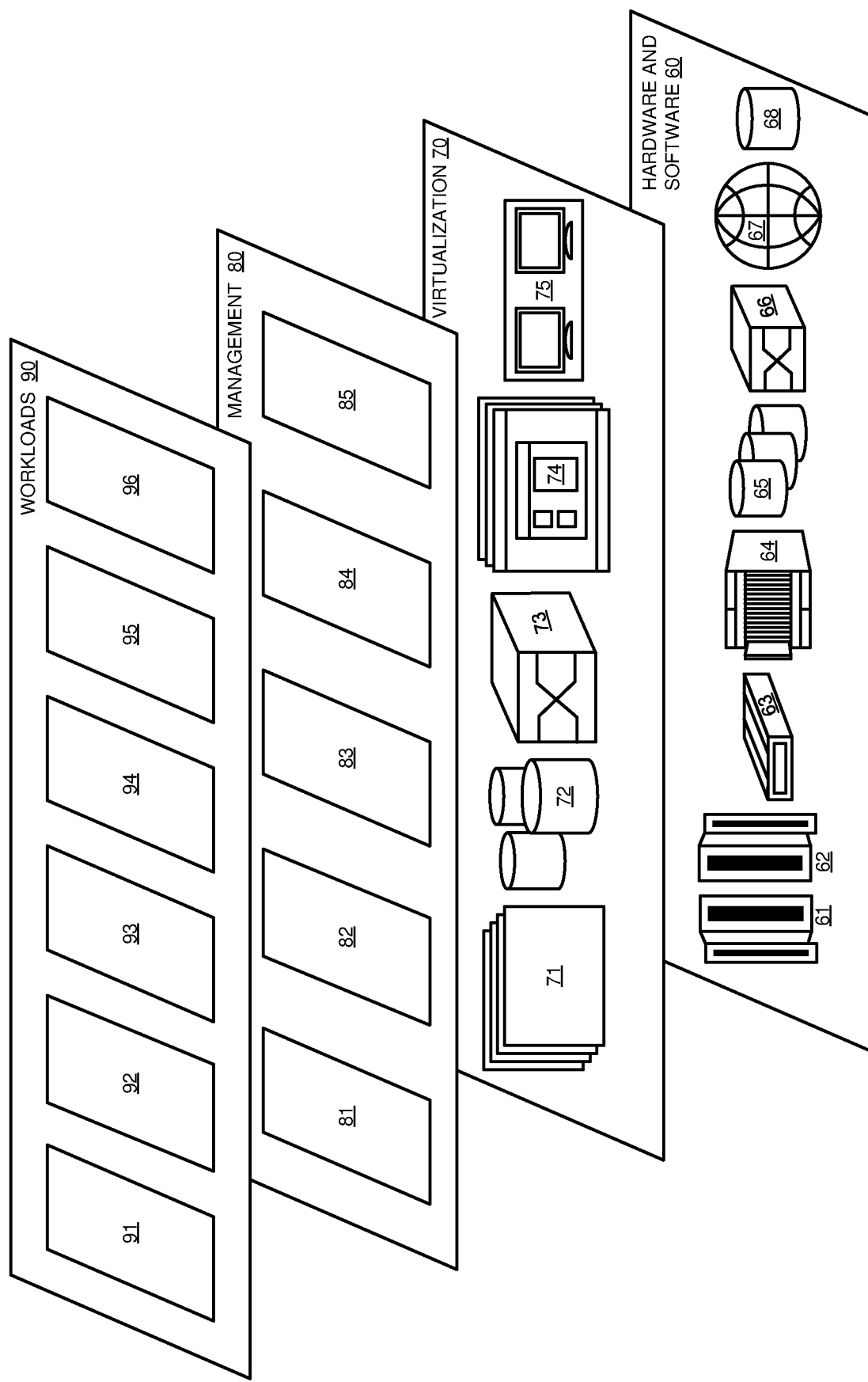
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for pipelined file server based data transmission and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
dividing, into a set of equal-size portions, a block of data intended for a set of receiving computer systems, the set of receiving computer systems comprising a first system and a second system, each portion comprising at least two bytes;
transmitting, from a first file server to the first system, an odd-numbered byte of a first portion of the set of portions, the first file server storing the block of data;
relaying, from the first file server to a second file server concurrently with the transmitting, the first portion;
causing transmitting, from the second file server to the first system, an even-numbered byte of the first portion of the set of portions; and
causing relaying, from the second file server to a third file server concurrently with the transmitting from the second file server to the first system, the first portion.

2. The computer-implemented method of claim 1, further comprising:
receiving, from the first system, a first request for the block of data;

receiving, from the second system, a second request for the block of data;

determining that the first request and the second request were received within a time period shorter than a threshold time period; and consolidating, into a consolidated request, the first request and the second request, the consolidated request specifying the block of data, the first system, and the second system.

3. The computer-implemented method of claim 1, further comprising:

determining, based on a data transmission capability of the first file server, a number of portions in the set of portions.

4. The computer-implemented method of claim 1, wherein the first portion is stored in a volatile memory of the second file server.

5. The computer-implemented method of claim 1, further comprising:

causing deleting of the first portion from a volatile memory of the second file server after the transmitting of the first portion from the second file server to the second system.

6. A computer program product for pipelined data transmission, the computer program product comprising:

one or more computer readable storage media, and program instructions collectively stored on the one or more computer readable storage media, the stored program instructions comprising:

program instructions to divide, into a set of equal-size portions, a block of data intended for a set of receiving computer systems, the set of receiving computer systems comprising a first system and a second system, each portion comprising at least two bytes;

program instructions to transmit, from a first file server to the first system, an odd-numbered byte of a first portion of the set of portions, the first file server storing the block of data;

program instructions to relay, from the first file server to a second file server concurrently with the transmitting, the first portion;

program instructions to cause transmitting, from the second file server to the first system, an even-numbered byte of the first portion of the set of portions; and program instructions to cause relaying, from the second file server to a third file server concurrently with the transmitting from the second file server to the first system, the first portion.

7. The computer program product of claim 6, the stored program instructions further comprising:

program instructions to receive, from the first system, a first request for the block of data;

program instructions to receive, from the second system, a second request for the block of data;

program instructions to determine that the first request and the second request were received within a time period shorter than a threshold time period; and program instructions to consolidate, into a consolidated request, the first request and the second request, the consolidated request specifying the block of data, the first system, and the second system.

8. The computer program product of claim 6, the stored program instructions further comprising:

program instructions to determine, based on a data transmission capability of the first file server, a number of portions in the set of portions.

9. The computer program product of claim 6, wherein the first portion is stored in a volatile memory of the second file server.

10. The computer program product of claim 6, the stored program instructions further comprising:

program instructions to cause deleting of the first portion from a volatile memory of the second file server after the transmitting of the first portion from the second file server to the second system.

11. The computer program product of claim 6, wherein the stored program instructions are stored in the at least one of the one or more storage media of a local data processing system, and wherein the stored program instructions are transferred over a network from a remote data processing system.

12. The computer program product of claim 6, wherein the stored program instructions are stored in the at least one of the one or more storage media of a server data processing system, and wherein the stored program instructions are downloaded over a network to a remote data processing system for use in a computer readable storage device associated with the remote data processing system.

13. The computer program product of claim 6, wherein the computer program product is provided as a service in a cloud environment.

14. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to divide, into a set of equal-size portions, a block of data intended for a set of receiving computer systems, the set of receiving computer systems comprising a first system and a second system, each portion comprising at least two bytes;

program instructions to transmit, from a first file server to the first system, an odd-numbered byte of a first portion of the set of portions, the first file server storing the block of data;

program instructions to relay, from the first file server to a second file server concurrently with the transmitting, the first portion;

program instructions to cause transmitting, from the second file server to the first system, an even-numbered byte of the first portion of the set of portions; and program instructions to cause relaying, from the second file server to a third file server concurrently with the transmitting from the second file server to the first system, the first portion.

15. The computer system of claim 14, the stored program instructions further comprising:

program instructions to receive, from the first system, a first request for the block of data;

program instructions to receive, from the second system, a second request for the block of data;

program instructions to determine that the first request and the second request were received within a time period shorter than a threshold time period; and program instructions to consolidate, into a consolidated request, the first request and the second request, the consolidated request specifying the block of data, the first system, and the second system.

16. The computer system of claim 14, the stored program instructions further comprising:
  program instructions to determine, based on a data transmission capability of the first file server, a number of portions in the set of portions.

17. The computer system of claim 14, wherein the first portion is stored in a volatile memory of the second file server.

* * * * *